United States Patent
Schaefer

(10) Patent No.: US 10,415,503 B2
(45) Date of Patent: Sep. 17, 2019

(54) CASCADE PIVOT DOOR-TYPE THRUST REVERSER FOR TURBOFAN ENGINE

(71) Applicant: SPIRIT AEROSYSTEMS, INC., Wichita, KS (US)

(72) Inventor: Henry Arnold Schaefer, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 594 days.

(21) Appl. No.: 15/455,834

(22) Filed: Mar. 10, 2017

(65) Prior Publication Data

US 2018/0258881 A1  Sep. 13, 2018

(51) Int. Cl.
| | |
|---|---|
| F02K 1/60 | (2006.01) |
| F02K 1/76 | (2006.01) |
| F02K 1/72 | (2006.01) |

(52) U.S. Cl.
CPC .............. *F02K 1/605* (2013.01); *F02K 1/60* (2013.01); *F02K 1/72* (2013.01); *F02K 1/763* (2013.01); *F05D 2220/323* (2013.01); *F05D 2240/129* (2013.01)

(58) Field of Classification Search
CPC ..... F02K 1/70; F02K 1/72; F02K 1/60; F02K 1/605; F02K 1/62; F02K 1/625; F02K 1/763
See application file for complete search history.

(56) References Cited

U.S. PATENT DOCUMENTS

| | | | |
|---|---|---|---|
| 3,134,226 A * | 5/1964 | Gardiner | .............. F02K 1/60 239/127.1 |
| 4,185,798 A | 1/1980 | Dickenson | |
| 4,790,495 A | 12/1988 | Greathouse et al. | |
| 5,090,197 A | 2/1992 | Dubois | |
| 5,893,265 A * | 4/1999 | Gonidec | ................ F02K 1/70 239/265.33 |
| 8,316,632 B2 | 11/2012 | West et al. | |
| 8,869,507 B2 | 10/2014 | Cloft et al. | |
| 9,016,040 B2 | 4/2015 | Stuart et al. | |
| 9,068,532 B2 | 6/2015 | Gormley | |
| 2009/0151320 A1 * | 6/2009 | Sternberger | ........... F02K 1/72 60/226.2 |

OTHER PUBLICATIONS

Hubbard Aviation Technologies QS3 Hushkit; webpage entitled http://www.hubavtech.com/qs3; dated Jun. 14, 2017.

* cited by examiner

*Primary Examiner* — Andrew H Nguyen
(74) *Attorney, Agent, or Firm* — Hovey Williams LLP

(57) ABSTRACT

A thrust reverser for reversing a thrust of a turbofan engine of an aircraft. The reverser includes a pivot door, a cascade component, and an actuation system. The door is moveable between lowered and raised positions in which a side outlet is, respectively, covered and uncovered. The cascade includes turning vanes, and is moveable between forward and rearward positions in which the cascade is positioned, respectively, not over and over the side outlet. The actuation system deploys the reverser by simultaneously moving the door to the raised position and moving the cascade to the rearward position over the side outlet, and stows the reverser by simultaneously moving the cascade to the forward position and moving the door to the lowered position. When the door is raised and the cascade is over the side outlet, airflow through the side outlet is directed at least partially forward to provide reverse thrust.

20 Claims, 7 Drawing Sheets

CASCADE PIVOT DOOR-TYPE THRUST REVERSER FOR TURBOFAN ENGINE

FIELD

The present invention relates to thrust reversers for aircraft engines, and, more particularly, to a pivot door-type reverser having a translatable cascade component.

BACKGROUND

Thrust reversers, such as pivot door-type and cascade-type reversers, are utilized on many different aircraft. The typical pivot door-type reverser includes a fixed structural component, rotating pivot doors, and an actuation system. When commanded to deploy, actuators force the doors to rotate to a predetermined angle, blocking the rearward airflow and turning it forward at an angle approximately equal to the rotated door angle. The pivot door position and angle turn the airflow forward to provide reverse thrust to improve deceleration early in the landing roll when residual aerodynamic lift and high speed limit the effectiveness of mechanical braking. The doors extend well into the external airstream when deployed and include so-called kicker plates, side fences, and/or other flow control devices to help direct the flow forward.

The typical translating sleeve cascade-type reverser includes a fixed structure component, a sliding external sleeve, pivoting blocker doors, a cascade structure, and an actuation system. When commanded to deploy, actuators translate the external sleeve aft and expose an area common to the cascade structures. The blocker doors deploy as the sleeve translates to block the exhaust flow and redirect it through the cascade. The cascade includes vanes specifically designed to both efficiently turn the airflow forward and control the efflux.

Additionally, a pivot door-type reverser having a cascade arrangement is known in which the cascade is stationary and requires the outer portion of the nozzle to translate while inner doors pivot to block the airflow.

Area match, reverse thrust effectiveness, and air efflux pattern are key aerodynamic performance measures that govern much of the design of thrust reversers. Area match is a ratio of the air mass flow during reverse thrust to the air mass flow during forward thrust (when the reverser is stowed). To ensure safe operation the air mass flow in reverse mode should nearly match or exceed the mass flow in forward mode; consequently, the reverse mass flow requirement is usually around 105% to 110% of the forward mass flow.

The reverse thrust effectiveness is a ratio of the actual reverse thrust versus the theoretically available reverse thrust, and determines how well the reverser will assist in braking of the aircraft during landing or refused take-off. Because the thrust reverser is considered a supplement to the wheel brakes, the reverse thrust effectiveness requirement is at the aircraft manufacturer's discretion, but aircraft operators want to maximize this capability. Recently, a demand for higher efficiency pivot door reversers has been evident in the industry.

Efflux control ensures the reverse airflow does not overly impinge on the surrounding aircraft structure or result in ingestion of air or debris into the engine. The efflux pattern is unique to each application, but in general requires the reverser to include aerodynamic flow devices to properly direct the reverse airflow.

Pivot door-type reversers have achieved effectiveness values in the range of 20% to 30%. In theory, higher effectiveness could be achieved by changing the door position and geometry to provide a higher forward thrust force. However, the necessary geometry changes result in the door length increasing to preserve aerodynamic equivalency, and the door must be adjusted rearward in order to maintain the required flow area for safe engine operation. A larger door placed further aft on the fixed structure challenges the typical turbofan nozzle envelope and can result in compromises to the external flow surface and nozzle exit surface. On the other hand, cascade-type reversers, readily achieve effectiveness values near 40% without compromising the external or internal flow surfaces. However, some weight penalties are usually incurred over pivot door-type reversers with the addition of the translating structure and the extra weight of the cascade baskets.

This background discussion is intended to provide information related to the present invention which is not necessarily prior art.

SUMMARY

Embodiments of the present invention solve the above-described and other problems and limitations by providing a pivot door-type reverser having a translatable cascade component. In contrast to existing pivot door-type reversers for which the effective flow area is only 50% to 60% of the geometric area provided by the doors, embodiments make use of almost 90% of the available flow area. As a result, the reverser components can be more easily housed in the given geometric envelope, or allow the required geometric envelope to be reduced. In particular, embodiments allow for shortening and simplifying the design of the pivot doors. The shortened doors impart fewer loads on the structure and are lighter weight, and the lighter weight doors at least partially offset the additional weight of the cascade component.

In a first embodiment of the present invention, a thrust reverser is provided for reversing a thrust of an engine, and may include a pivot door, a cascade component, and an actuation system. The pivot door may be moveable between a lowered position in which a side outlet is covered, and a raised position in which the side outlet is uncovered and an airflow through the engine is directed through the side outlet and in an at least partially forward direction to provide a reverse thrust. The cascade component may be moveable between a forward position in which the pivot door is in the lowered position and the cascade component is not located over the side outlet, and a rearward position in which the pivot door is in the raised position and the cascade component is located over at least a portion of the side outlet to further direct the airflow in the at least partially forward direction to increase the reverse thrust. The actuation system may be configured to deploy the thrust reverser by simultaneously moving the pivot door to the raised position and moving the cascade component to the rearward position, and stow the thrust reverser by simultaneously moving the cascade component to the forward position and moving the pivot door to the lowered position.

In a second embodiment of the present invention, a thrust reverser may be provided for reversing a thrust of an engine of an aircraft, wherein the aircraft includes a nacelle having a fixed structure for supporting the engine, and the thrust reverser may include a pivot door, a cascade component, and an actuation system. The pivot door may be moveable between a lowered position in which a side outlet is covered and an airflow is directed through a rear outlet to provide a forward thrust, and a raised position in which the rear outlet is covered and the side outlet is uncovered and the airflow is directed through the side outlet and in an at least partially forward direction to provide a reverse thrust. The cascade component may include a plurality of turning vanes, and may be moveable between a forward position in which the pivot door is in the lowered position and the cascade component is not located over the side outlet, and a rearward position in which the pivot door is in the raised position and the cascade component is located over at least a portion of the side outlet so that the plurality of turning vanes further direct the airflow in the at least partially forward direction to increase the reverse thrust. The actuation system may be mounted to the fixed structure and configured to deploy the thrust reverser by simultaneously moving the pivot door to the raised position to uncover the side outlet and moving the cascade component to the rearward position over the side outlet, and stow the thrust reverser by simultaneously moving the cascade component to the forward position and moving the pivot door to the lowered position to cover the side outlet.

In a third embodiment of the present invention, a thrust reverser may be provided for reversing a thrust of a turbofan engine of an aircraft, wherein the aircraft includes a fixed structure, including a forward fan duct, for supporting the turbofan engine, and the thrust reverser may include a pivot door, a cascade component, and an actuation system. The pivot door may be mounted to the fixed structure by a hinge, and may be moveable between a lowered position in which a side outlet is covered and an airflow is directed through a rear outlet to provide a forward thrust, and a raised position in which the rear outlet is covered and the side outlet is uncovered and the airflow is directed through the side outlet and in an at least partially forward direction to provide a reverse thrust. The cascade component may include a plurality of turning vanes, and the cascade component may be moveable between a forward position in which the pivot door is in the lowered position and the cascade component is located in a space within the forward fan duct and not over the side outlet which is covered, and a rearward position in which the pivot door is in the raised position and the cascade component is located over at least a portion of the side outlet which is uncovered so that the plurality of turning vanes further direct the airflow in the at least partially forward direction to increase the reverse thrust. The actuation system may be mounted to the fixed structure and may including a linear actuator and a linkage configured to deploy the thrust reverser by simultaneously moving the pivot door to the raised position to uncover the side outlet and moving the cascade component to the rearward position over the side outlet, and stow the thrust reverser by simultaneously moving the cascade component to the forward position and moving the pivot door to the lowered position to cover the side outlet.

Various implementations of the foregoing embodiments may include any one or more of the following additional features. There may be a plurality of pivot doors, a plurality of cascade components, and a plurality of actuation systems provided on the engine, and each pivot door may be associated with a respective cascade component and a respective actuation system. When the cascade component is in the rearward position the cascade component may be located over an entirety of the side outlet. The actuation system may further include two or more rails, wherein the cascade component is slideable on the two or more rails to facilitate moving the cascade component between the forward position and the rearward position.

The actuation system may include a linear actuator mounted to the fixed structure and connected to the cascade component, and configured to extend and retract, and a linkage coupled with the linear actuator and connected to the pivot door, wherein when the linear actuator extends the cascade component is moved to the rearward position and, via the linkage, the pivot door is moved to the raised position, and when the linear actuator retracts the cascade component is moved to the forward position and, via the linkage, the pivot door is moved to the lowered positioned. Alternatively, the actuation system may include a linear actuator mounted to the fixed structure and connected to the pivot door, and configured to extend and retract, and a linkage connected to the linear actuator and connected to the cascade component, wherein when the linear actuator extends the pivot door is moved to the raised position and, via the linkage, the cascade component is moved to the rearward position, and when the linear actuator retracts the pivot door is moved to the lowered position and, via the linkage, the cascade component is moved to the forward position.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein.

Figure 1:
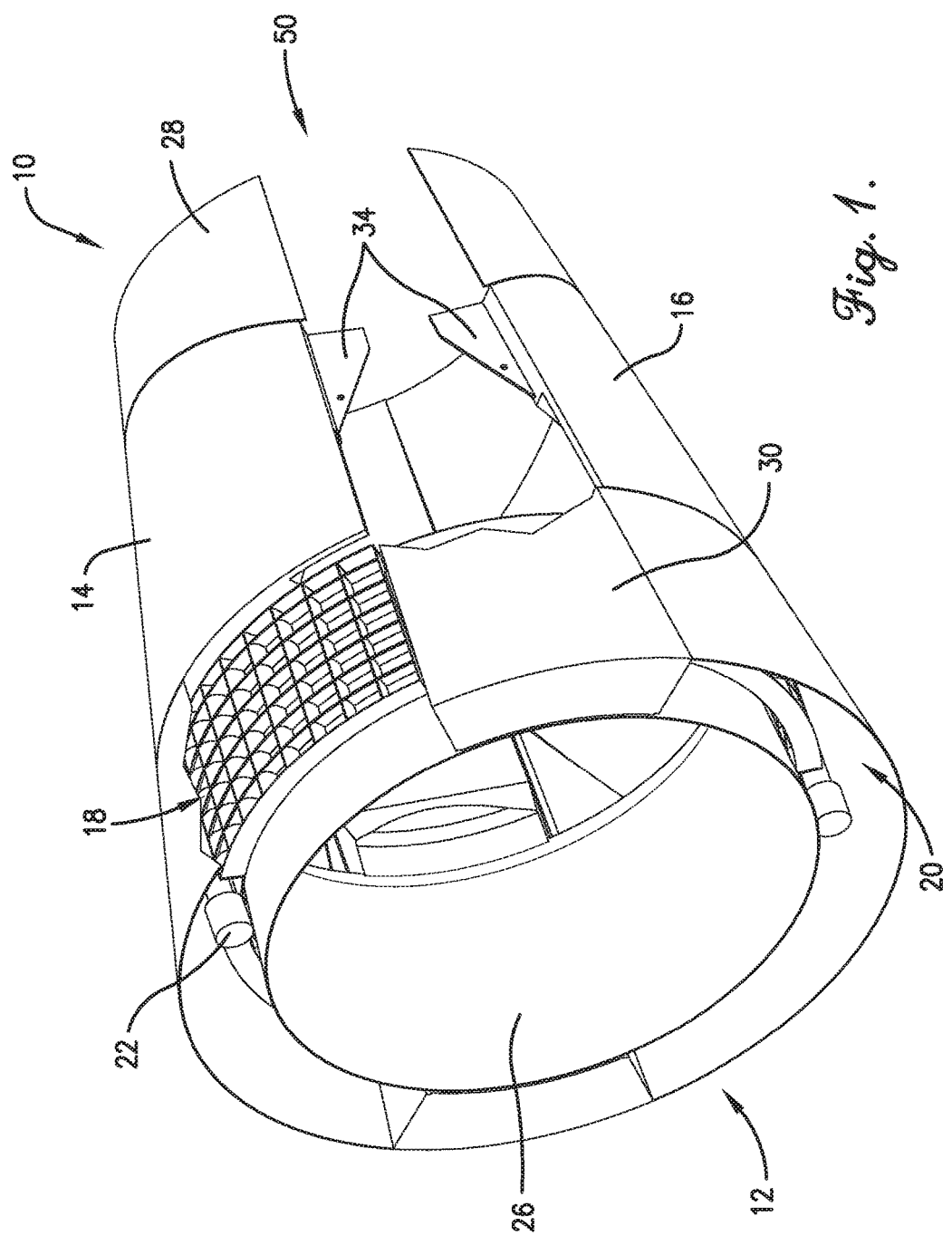
FIG. 1 is a cutaway front isometric view of an embodiment of a thrust reverser constructed in accordance with the present technology, and shown in a stowed state.
Figure 2:
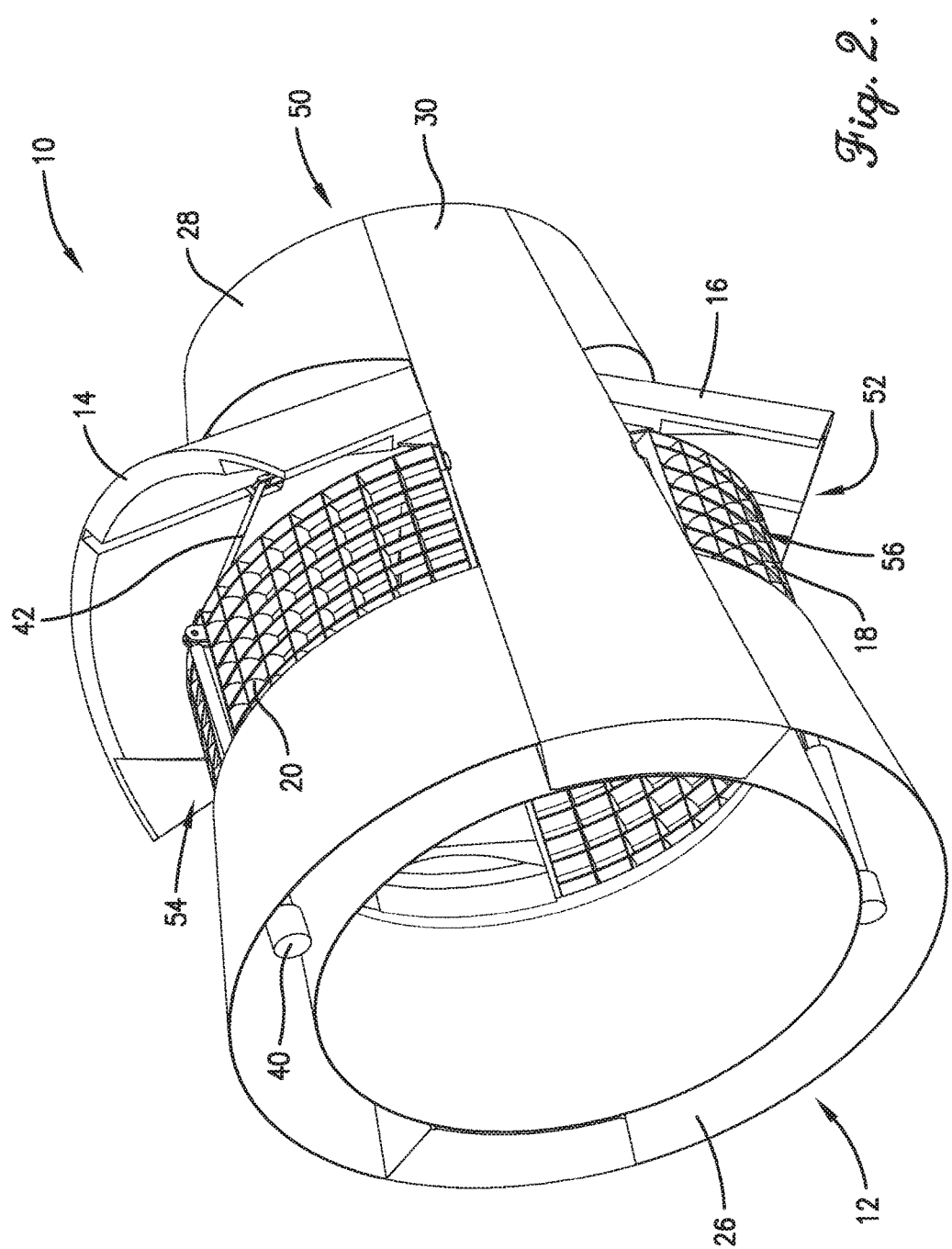
FIG. 2 is a cutaway front isometric view of the thrust reverser shown in a deployed state.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

As used herein, the terms "side" and "sidewardly" (as in, e.g., "side outlet" and "sidewardly airflow") broadly refer to a direction that is angular to a centerline axis extending between an intake and a rear outlet of an engine. The direction may be along a horizontal plane including the axis (i.e., left and right), a vertical plane including the axis (i.e., up and down), and/or any plane including the axis therebetween. In general, the direction will be determined by the mounting position of the engine on the craft and/or other design factors.

Broadly characterized, the present invention provides an improved thrust reverser for, e.g., a turbofan or other suitable engine of an aircraft or other craft employing such an engine. More particularly, embodiments provide an improved pivot door-type reverser having a translatable cascade component. The improved reverser advantageously increases the effectiveness of pivot door-type thrust reverser configurations without requiring excessive modifications to the geometry envelope of the existing turbofan nozzle, or, alternatively, allows for reducing the geometry envelope of the turbofan nozzle while maintaining the same level of effectiveness currently provided by larger state-of-the-art thrust reverser configurations.

Referring to the figures, an embodiment of the thrust reverser 10 may be mounted to a fixed support structure 12, and may include a plurality of pivot doors 14,16, a plurality of cascade components 18,20, and an actuation system 22. Some or all of these components may be housed in or on a nozzle portion of an otherwise typical mixed flow turbofan engine nacelle. In more detail, the fixed structure 12 may be part of a nacelle that houses and supports the turbofan engine, and may provide structural support and stability for some or all of the other components of the thrust reverser 10. Although the fixed structure 12 is shown as including a forward fan duct component 26, an aft fan duct component 28, and a plurality of beams 30 extending between the forward and aft fan duct components 26,28, additional or alternative components may be present in the fixed structure 12.

Figure 5:
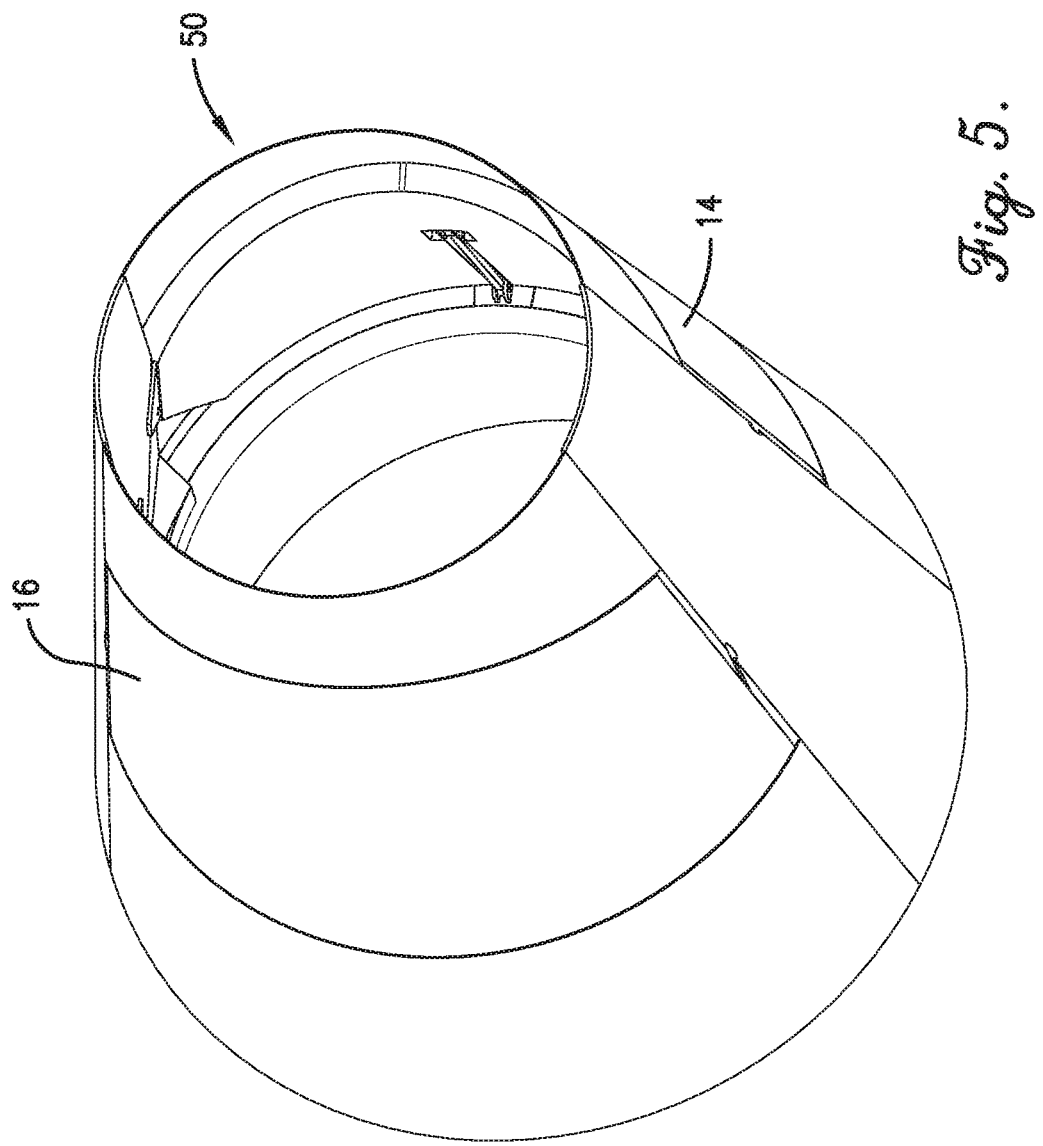
FIG. 5 is a rear isometric view of the thrust reverser showing the pivot door in a lowered position (i.e., stowed)
Figure 6:
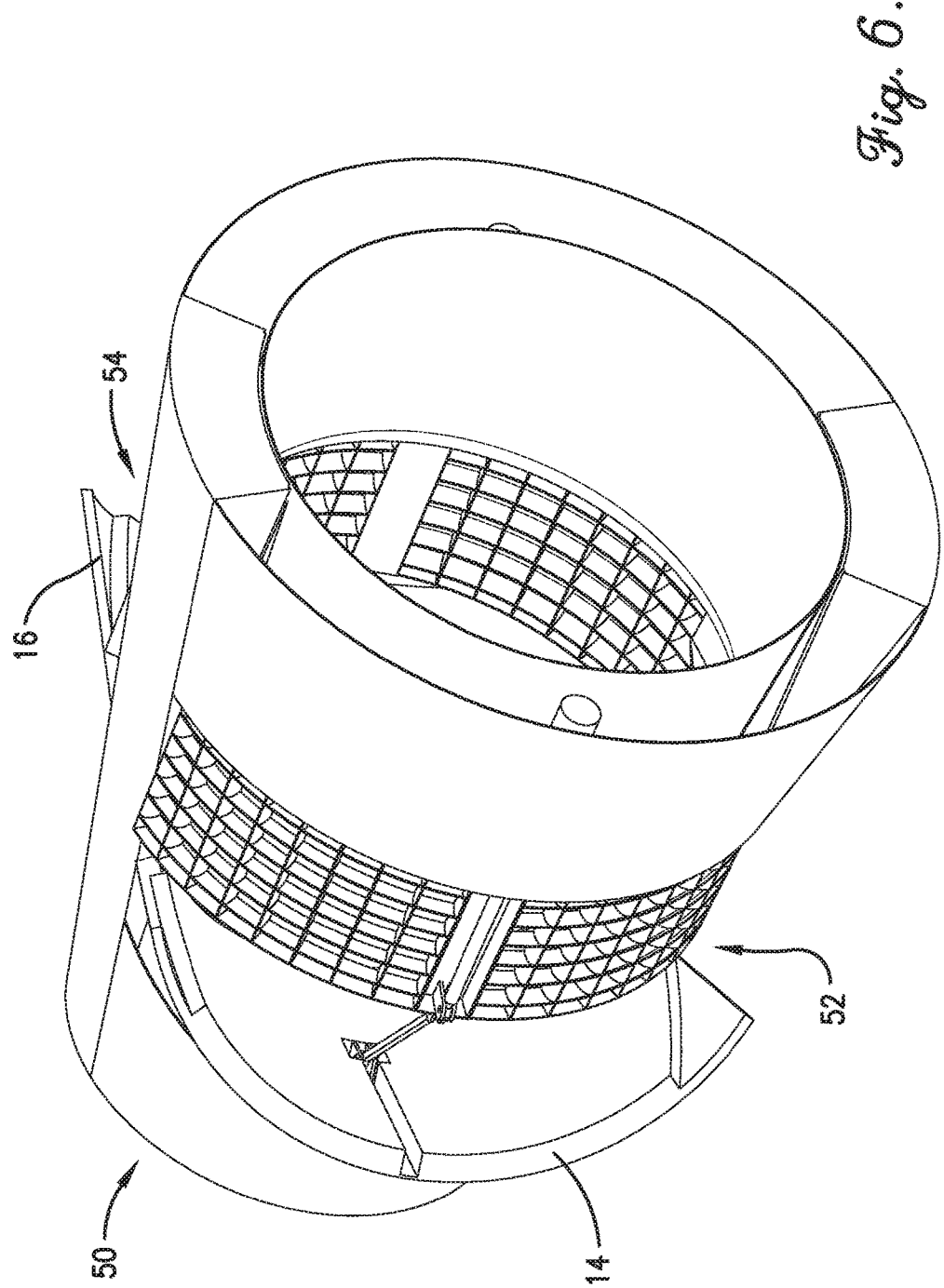
FIG. 6 is a front isometric view of the thrust reverser showing a cascade component in a rearward position (i.e., deployed)
Figure 7:
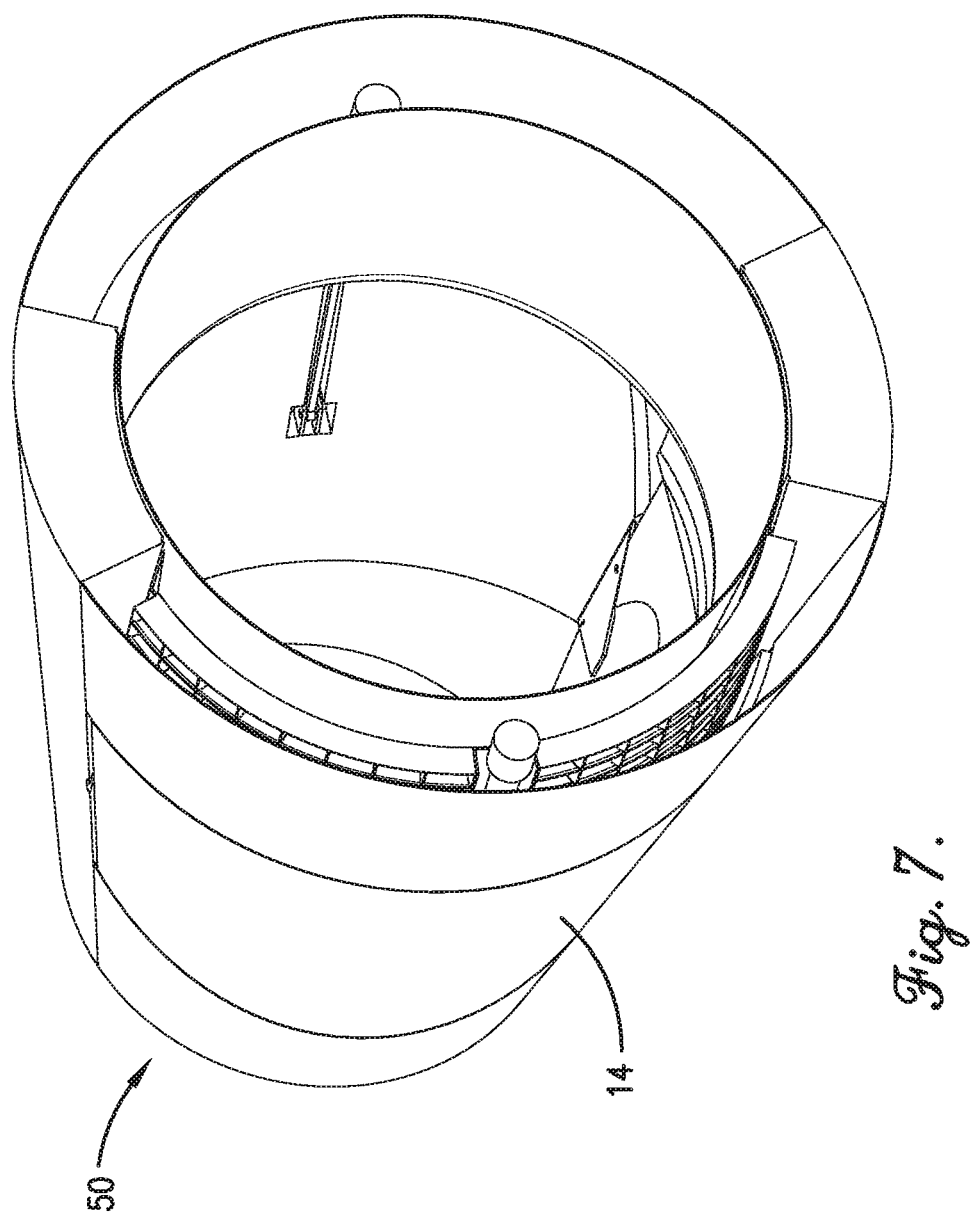
FIG. 7 is a front isometric view of the thrust reverser showing the cascade component in a forward position (i.e., stowed).

Broadly, the pivot doors 14,16 may function to at least partially control the direction of airflow and thereby control the direction of thrust (i.e., forward or reverse). When lowered (i.e., stowed), as seen in FIGS. 1, 5, and 7, the pivot doors 14,16 may be held in place by locking components on the fixed structure 12, and may uncover a rear outlet 50 and cover side outlets 52,54 to allow for rearward airflow for forward thrust operation of the engine. When raised (i.e., deployed), as seen in FIGS. 2, 3, 4, and 6, the doors 14,16 may open so that they cover the rear outlet 50 and at least partially uncover the side outlets 52,54 to allow for sidewardly airflow which is at least partially directed forwardly for reverse thrust operation of the engine. Thus, the doors 14,16 in combination with the fixed structure 12 may at least partially define the outer and inner flow surfaces of the turbofan nozzle.

The plurality of pivot doors 14,16 may be movably attached to the fixed structure 12 (e.g., the beams 30) with hinges 34 located toward the aft end of each door 14,16 on both the inboard and outboard portions of the thrust reverser 10. The hinges 34 may be simple hinges configured to pivot the doors about a single pivot axis, or they may be more complex hinges to achieve more complex movement of the doors 14,16 between their lowered and raised positions. Although shown in the figures as having two pivot doors 14,16, the thrust reverser 10 may have substantially any number of doors. For example, in one alternative implementation, the thrust reverser 10 may include four pivot doors which may be spaced asymmetrically around the nacelle. Further, although shown configured for use with a side-mounted engine, which typical employs upper and lower pivot doors, in an alternative implementation the thrust reverse 10 may be configured for use with a center-mounted engine, which typically employs left and right pivot doors.

Broadly, the cascade components 18,20 may function to further control the direction of airflow during reverse thrust operation. To that end, each cascade component 18,20 may include a plurality of "turning" vanes 56 configured to further turn or redirect the sidewardly flow of the engine exhaust at least partially in the forwardly direction. In more detail, the movement of the pivot doors 14,16 between their raised and lowered positions corresponds with movement of the cascade components 18,20 between their, respectively, rearward (i.e., deployed) and forward (i.e., stowed) positions. When the pivot doors 14,16 are in their lowered positions the cascade components 18 may be in their forward position within the forward fan duct component 26 and isolated from any airflow, and when the doors 14,16 are in their raised position the cascade components 18 may be translated to their rearward position to be at least partially over the uncovered side outlets 52,54 to further direct the sideward airflow at least partially in the forwardly direction during reverse thrust operation of the engine. Thus, the cascade components 18,20 in combination with the pivot doors 14,16 may work together to provide improved control over and redirection of the sideward airflow during reverse thrust operation.

Each of the plurality of cascade components 18,20 may be mounted on rail components 38 to facilitate sliding translation of the cascade components 18,20 between their forward and rearward positions. The rails 38 may be located on the fixed forward fan duct component 26 and/or the structural beams 30, such that, when in the forward position, the cascade components 18,20 are received in stowage spaces between the inner and outer surfaces of the forward fan duct component 26.

Although shown in the figures as having two cascade components 18,20 the thrust reverser 10 may have substantially any number of cascade components including at least one cascade component associated with each pivot door. Further, although the cascade components 18,20 are shown as covering all or a large portion of the side outlets 52,54 when in the rearward position, in an alternative implementation the cascade components may cover only a portion of the area, such as a forward portion of the area, with the pivot door providing added flow-turning as well.

Figure 3:
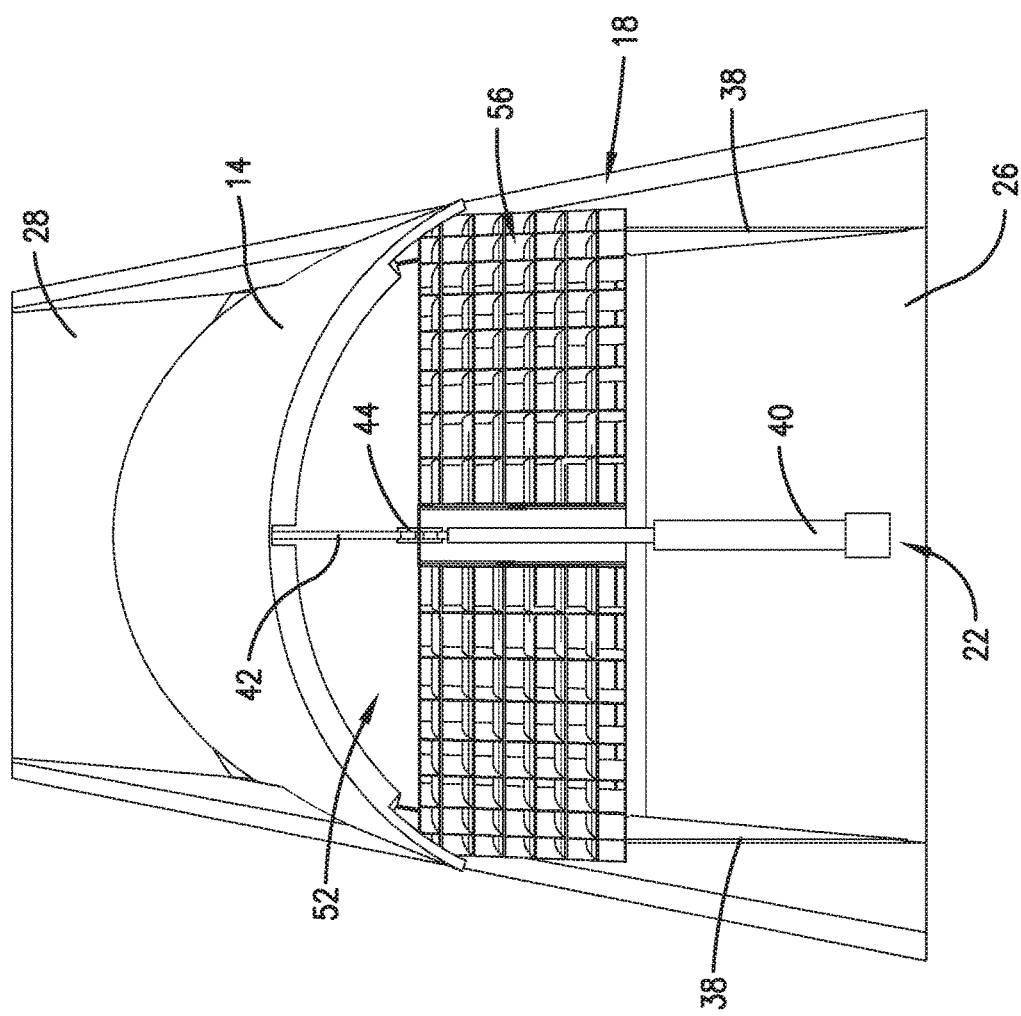
FIG. 3 is a fragmentary plan view of the thrust reverser showing certain components in the deployed state.
Figure 4:
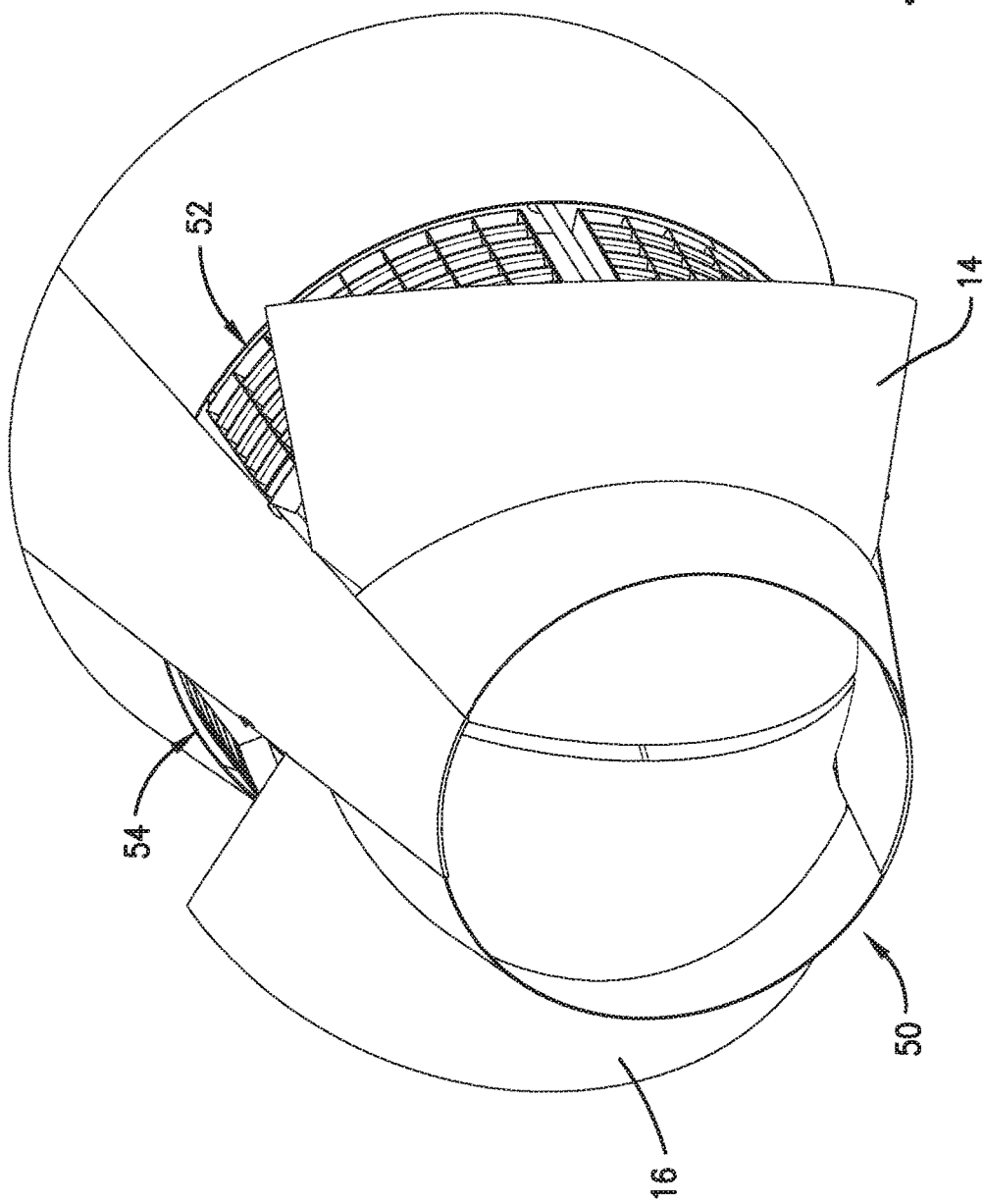
FIG. 4 is a rear isometric view of the thrust reverser showing a pivot door in a raised position (i.e., deployed)

Referring particularly to FIG. 3, the actuation system 22 may be configured to move the pivot doors 14,16 and cascade components 18,20 between their deployed and stowed positions. The actuation system 22 may include linear actuators 40 and linkages 42. Each linear actuator 40 may be at one end mounted to the fixed forward fan duct 26 and at the other end coupled with one of the cascade components 18,20 and configured to provide the motive force for translating a respective one of the cascade components 18,20 along the rails 38 between the forward and rearward positions. Each linkage 42 may be coupled at one end to the one of the pivot doors 14,16 and at the other end to a respective one of the linear actuators 22 or a respective one of the cascade components 18,20 and configured to transfer the motive force provided by the linear actuator 40 to the cascade component 18,20 to the pivot door 14,16 as well so that the cascade components 18,20 and the pivot door 14,16 move simultaneously together between their stowed and deployed positions.

In more detail, when the actuators 40 retract, the cascade components 18,20 may move forwardly parallel to a centerline axis of the nacelle to the forward position within the fixed forward fan duct 26. Further, as the actuators 40 retract, the linkages 42 connecting the actuators 40 or the cascade components 18,20 to the pivot doors 14,16 cause the pivot doors 14,16 to rotate on the hinges 34 to the lowered position to uncover the rear outlet 50 and cover the side outlets 52,54. Similarly, when the actuators 40 extend, the cascade components 18,20 move rearwardly along the centerline axis of the nacelle to the rearward position over the side outlets 52,54. Further, as the actuators 40 extend, the linkages 42 connecting the actuators 40 or the cascade components 18,20 to the pivot doors 14,16 cause the pivot doors 14,16 to rotate on the hinge 34 to the raised position to cover the rear outlet 50 and uncover the side outlets 52,54.

In an alternative implementation of the same concept, the actuators may drive the pivot doors to rotate, and linkages from the actuators or the pivot doors to the cascade components may transfer the movement to the cascade components. In another possible implementation of the same concept, the actuators or linkages for driving the pivot doors may be directly mounted to the pivot doors or mounted on the side beams with a yoke-type system for rotating the pivot doors.

By incorporating the cascade components 18,20 into the pivot door-type thrust reverser architecture, the present technology takes advantage of the existing inherently stable fixed structure 12 in order to minimize weight while incorporating the flow advantages of the cascade configuration in order to achieve higher effectiveness and efflux control. Impacts to the aerodynamic performance include the following.

With regard to area match, one of the major drawbacks with standard pivot door reversers is the inefficient use of the flow area provided when the pivot doors rotate. That is, the air has a tendency to separate from the internal flow lines and essentially skip by a large portion of the forward flow area. As a result the effective flow area is only 50% to 60% of the geometric area provided by the pivoting doors. However, the cascade structure of the present technology makes use of almost 90% of the available flow area. In this manner, the thrust reverser components can more easily be housed in the given geometric envelope, or allow the required geometric envelope to be reduced.

With regard to reverse effectiveness/efflux, in addition to providing efficient airflow, the cascade baskets of the present technology turn the air forward to provide reverse thrust and control the efflux pattern rather than relying only on the door to turn the flow. The effectiveness of the cascades should be in the range of existing cascade type reversers, so the present technology improves upon the effectiveness of the state-of-the-art pivot doors by over 30%. Furthermore, since the door shape does not play as large a role in reversing thrust, it can be shortened and simplified. For example, the kicker plate structures and side fences may be eliminated. The shortened door imparts fewer loads on the structure, is lighter weight, and can be more easily housed in a given geometry or allow for reducing the required geometric envelope. Additionally, the lower weight door aids in offsetting the additional weight of the cascade component.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A thrust reverser for reversing a thrust of an engine, the thrust reverser comprising:
   a pivot door moveable between—
   a lowered position in which a side outlet is covered, and
   a raised position in which the side outlet is uncovered and an airflow through the engine is directed through the side outlet and in an at least partially forward direction to provide a reverse thrust;
   a cascade component which is indirectly connected to the pivot door, the cascade component moveable between—
   a forward position in which the pivot door is in the lowered position and the cascade component is not located over the side outlet, and
   a rearward position in which the pivot door is in the raised position and the cascade component is located over at least a portion of the side outlet to further direct the airflow in the at least partially forward direction to increase the reverse thrust; and
   an actuation system configured to—
   deploy the thrust reverser by simultaneously moving the pivot door to the raised position and moving the cascade component to the rearward position, and
   stow the thrust reverser by simultaneously moving the cascade component parallel to a centerline axis of the engine to the forward position and moving the pivot door to the lowered position.

2. The thrust reverser of claim 1, wherein the pivot door is one of a plurality of pivot doors, the cascade component is one of a plurality of cascade components, and the actuation system is one of a plurality of actuation systems provided on the engine, and each pivot door is associated with a respective cascade component of the plurality of cascade components and a respective actuation system of the plurality of actuation systems.

3. The thrust reverser of claim 1, wherein the actuation system includes—
   a linear actuator connected to the cascade component, and configured to extend and retract; and
   a linkage coupled with the linear actuator and connected to the pivot door,
   wherein when the linear actuator extends the cascade component is moved to the rearward position and, via the linkage, the pivot door is moved to the raised position, and when the linear actuator retracts the cascade component is moved to the forward position and, via the linkage, the pivot door is moved to the lowered positioned.

4. The thrust reverser of claim 1, wherein the actuation system includes—
   a linear actuator connected to the pivot door, and configured to extend and retract; and a linkage connected to the linear actuator and connected to the cascade component, wherein when the linear actuator extends the pivot door is moved to the raised position and, via the linkage, the cascade component is moved to the rearward position, and when the linear actuator retracts the pivot door is moved to the lowered position and, via the linkage, the cascade component is moved to the forward position.

5. The thrust reverser of claim 1, wherein the cascade component is received within a forward fan duct component associated with the engine when the cascade component is in the forward position.

6. The thrust reverser of claim 1, further including two or more rails, wherein the cascade component is slideable on the two or more rails to facilitate moving the cascade component between the forward position and the rearward position.

7. A thrust reverser for reversing a thrust of an engine of an aircraft, the aircraft including a nacelle and a fixed structure for supporting the engine, the thrust reverser comprising:
   a pivot door moveable between—
   a lowered position in which a side outlet is covered and an airflow is directed through a rear outlet to provide a forward thrust, and
   a raised position in which the rear outlet is covered and the side outlet is uncovered and the airflow is directed through the side outlet and in an at least partially forward direction to provide a reverse thrust;
   a cascade component which is indirectly connected to the pivot door and which has a plurality of turning vanes, the cascade component moveable between—a forward position in which the pivot door is in the lowered position and the cascade component is not located over the side outlet, and
   a rearward position in which the pivot door is in the raised position and the cascade component is located over at least a portion of the side outlet so that the plurality of turning vanes further direct the airflow in the at least partially forward direction to increase the reverse thrust; and
   an actuation system mounted to the fixed structure and configured to—
   deploy the thrust reverser by simultaneously moving the pivot door to the raised position to uncover the side outlet and moving the cascade component to the rearward position over the side outlet, and
   stow the thrust reverser by simultaneously moving the cascade component parallel to a centerline axis of the engine to the forward position and moving the pivot door to the lowered position to cover the side outlet.

8. The thrust reverser of claim 7, wherein the pivot door is one of a plurality of pivot doors, the cascade component is one of a plurality of cascade components, and the actuation system is one of a plurality of actuation systems provided on the engine, and each pivot door is associated with a respective cascade component of the plurality of cascade components and a respective actuation system of the plurality of actuation systems.

9. The thrust reverser of claim 7, wherein the actuation system includes—
   a linear actuator mounted to the fixed structure and connected to the cascade component, and configured to extend and retract; and
   a linkage coupled with the linear actuator and connected to the pivot door, wherein when the linear actuator extends the cascade component is moved to the rearward position and, via the linkage, the pivot door is moved to the raised position, and when the linear actuator retracts the cascade component is moved to the forward position and, via the linkage, the pivot door is moved to the lowered positioned.

10. The thrust reverser of claim 7, wherein the actuation system includes—
   a linear actuator mounted to the fixed structure and connected to the pivot door, and configured to extend and retract; and
   a linkage connected to the linear actuator and connected to the cascade component,
   wherein when the linear actuator extends the pivot door is moved to the raised position and, via the linkage, the cascade component is moved to the rearward position, and when the linear actuator retracts the pivot door is moved to the lowered position and, via the linkage, the cascade component is moved to the forward position.

11. The thrust reverser of claim 7, wherein when the cascade component is in the rearward position the cascade component is located over an entirety of the side outlet.

12. The thrust reverser of claim 7, wherein the pivot door is attached to the fixed structure by a hinge which facilitates moving the pivot door between the raised position and the lowered position.

13. The thrust reverser of claim 7, wherein the fixed structure includes a forward fan duct component, and the cascade component is received within the forward fan duct component when the cascade component is in the forward position.

14. The thrust reverser of claim 7, further including two or more rails, wherein the cascade component is slideable on the two or more rails to facilitate moving the cascade component between the forward position and the rearward position.

15. A thrust reverser for reversing a thrust of a turbofan engine of an aircraft, the aircraft including a fixed structure, including a forward fan duct, for supporting the turbofan engine, the thrust reverser comprising:
   a pivot door mounted to the fixed structure by a hinge and moveable between—
   a lowered position in which a side outlet is covered and an airflow is directed through a rear outlet to provide a forward thrust, and
   a raised position in which the rear outlet is covered and the side outlet is uncovered and the airflow is directed through the side outlet and in an at least partially forward direction to provide a reverse thrust;
   a cascade component which is indirectly connected to the pivot door and which has a plurality of turning vanes, the cascade component moveable between—
   a forward position in which the pivot door is in the lowered position and the cascade component is located in a space within the forward fan duct and not over the side outlet which is covered, and
   a rearward position in which the pivot door is in the raised position and the cascade component is located over at least a portion of the side outlet which is uncovered so that the plurality of turning vanes further direct the airflow in the at least partially forward direction to increase the reverse thrust; and
   an actuation system mounted to the fixed structure and including a linear actuator and a linkage configured to— deploy the thrust reverser by simultaneously moving the pivot door to the raised position to uncover the side outlet and moving the cascade component to the rearward position over the side outlet, and stow the thrust reverser by simultaneously moving the cascade component parallel to a centerline axis of the engine to the forward position and moving the pivot door to the lowered position to cover the side outlet.

16. The thrust reverser of claim 15, wherein the pivot door is one of a plurality of pivot doors, the cascade component is one of a plurality of cascade components, and the actuation system is one of a plurality of actuation systems provided on the turbofan engine, and each pivot door is associated with a respective cascade component of the plurality of cascade components and a respective actuation system of the plurality of actuation systems.

17. The thrust reverser of claim 15, wherein— the linear actuator is mounted to the fixed structure and connected to the cascade component, and configured to extend and retract; and the linkage is coupled with the linear actuator and connected to the pivot door, wherein when the linear actuator extends the cascade component is moved to the rearward position and, via the linkage, the pivot door is moved to the raised position, and when the linear actuator retracts the cascade component is moved to the forward position and, via the linkage, the pivot door is moved to the lowered positioned.

18. The thrust reverser of claim 15, wherein— the linear actuator is mounted to the fixed structure and connected to the pivot door, and configured to extend and retract; and the linkage is connected to the linear actuator and connected to the cascade component, wherein when the linear actuator extends the pivot door is moved to the raised position and, via the linkage, the cascade component is moved to the rearward position, and when the linear actuator retracts the pivot door is moved to the lowered position and, via the linkage, the cascade component is moved to the forward position.

19. The thrust reverser of claim 15, wherein when the cascade component is in the rearward position the cascade component is located over an entirety of the side outlet.

20. The thrust reverser of claim 15, further including two or more rails, wherein the cascade component is slideable on the two or more rails to facilitate moving the cascade component between the forward position and the rearward position.

* * * * *